(12) United States Patent
Gambardella et al.

(10) Patent No.: US 11,934,932 B1
(45) Date of Patent: Mar. 19, 2024

(54) ERROR AWARE MODULE REDUNDANCY FOR MACHINE LEARNING

(71) Applicant: XILINX, INC., San Jose, CA (US)

(72) Inventors: Giulio Gambardella, Portmarnock (IE); Nicholas Fraser, County Dublin (IE); Ussama Zahid, Saggart (IE); Michaela Blott, Dublin (IE); Kornelis A. Vissers, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 790 days.

(21) Appl. No.: 17/094,598

(22) Filed: Nov. 10, 2020

(51) Int. Cl.
   *G06N 20/20* (2019.01)
   *G06F 11/16* (2006.01)
   *G06N 3/045* (2023.01)
   *G06N 3/08* (2023.01)

(52) U.S. Cl.
   CPC ............. *G06N 20/20* (2019.01); *G06F 11/16* (2013.01); *G06N 3/045* (2023.01); *G06N 3/08* (2013.01)

(58) Field of Classification Search
   CPC .................................................... G06F 11/16
   See application file for complete search history.

(56) References Cited

U.S. PATENT DOCUMENTS 11,010,233 B1 * 5/2021 Golden .................. G06F 21/554
2019/0220745 A1 * 7/2019 Huang ..................... G06N 3/08

OTHER PUBLICATIONS

Khosrowjerdi, Hojat, Karl Meinke, and Andreas Rasmusson. "Virtualized-fault injection testing: A machine learning approach." 2018 IEEE 11th International Conference on Software Testing, Verification and Validation (ICST). IEEE, 2018. (Year: 2018).*
Heo, Seongmin, and Jay H. Lee. "Fault detection and classification using artificial neural networks." IFAC—PapersOnLine 51.18 (2018): 470-475. (Year: 2018).*
Lyons, R.E., et al., The Use of Triple-Modular Redundancy to Improve Computer Reliability, IBM Journal of Research and Development, vol. 6, No. 2, Apr. 1962, pp. 200-209.
Schapire, Robert E., "A Brief Introduction to Boosting," Proceedings of the 16th International Joint Conference on Artificial Inteligence, vol. 2 (UCAI'99), 6 pages.
Xilinx, "Isolation Design Flow," Xilinx, Inc., San Jose, California, USA, retrieved from https://www.xilinx.com/applications/isolation-design-flow.html.

(Continued)

*Primary Examiner* — Eric Nilsson
(74) *Attorney, Agent, or Firm* — Patterson + Sheridan, LLP (57) ABSTRACT

Examples herein propose operating redundant ML models which have been trained using a boosting technique that considers hardware faults. The embodiments herein describe performing an evaluation process where the performance of a first ML model is measured in the presence of a hardware fault. The errors introduced by the hardware fault can then be used to train a second ML model. In one embodiment, a second evaluation process is performed where the combined performance of both the first and second trained ML models is measured in the presence of a hardware fault. The resulting errors can then be used when training a third ML model. In this manner, the three trained ML models are trained to be error aware. As a result, during operation, if a hardware fault occurs, the three ML models have better performance relative to three ML models that where not trained to be error aware.

20 Claims, 8 Drawing Sheets

(56) References Cited

OTHER PUBLICATIONS

Xilinx, "Xilinx TMRTool User Guide", Xilinx, Inc., UG156 (V3. 1.2), Jun. 23, 2017, 112 pages, Xilinx, Inc., San Jose, California, USA, retrieved from https://www.xilinx.com/support/documentation/user_guides/ug156-tmrtool.pdf.
Umuroglu, Y., et al., "Finn: A Framework for Fast, Scalable Binarized Neural Network Inference," Proceedings of the 2017 ACM/SIGDA International Symposium on Field_Programmable Gate Arrays, Feb. 2017, pp. 65-74.
The CIFAR-10 and CIFAR-100 datasets, retrieved from https://www.cs.toronto.edu/~kriz/cifar.html.
International Technology Roadmap for Semiconductors, 2001 Edition, Executive Summary, 68 pages, retrieved from https://www.https://www.semiconductors.org/wp-content/uploads/2018/08/2001-Executive-Summary.pdf.

* cited by examiner

ERROR AWARE MODULE REDUNDANCY FOR MACHINE LEARNING

TECHNICAL FIELD

Examples of the present disclosure generally relate to training machine learning models (e.g., neural networks) to be resilient to hardware faults.

BACKGROUND

Artificial Neural Networks (ANNs) (or just Neural Networks (NN)) can be used for many different applications, but when used in safety-critical products like automotive, space stations, aircraft or industry, the system must guarantee a failure-free behavior in the presence of faults in the underlying hardware device executing the NN. In several cases complete triplication of the whole network is deployed to guarantee safety integrity levels, such as triple module redundancy (TMR) often used in safety critical applications. In TMR, the output of the circuit is computed via majority voting from the outputs of three identical copies of the target circuit. In this case, a complete failure of one of the three circuits still guarantees failure-free system behavior.

Boosting can also be performed to improve the accuracy of an ensemble of NNs. Boosting combines the predictions from multiple different NNs to reduce the bias and variance of predictions and increases the overall accuracy. The predictions achieved by an ensemble of NNs that have been boosted are better than any individual NN. Adaptive Boosting is one of the most common techniques which helps training of multiple weak classifiers to form a highly accurate classifier when they are combined. Adaptive Boosting adds more weight to those examples which were not correctly classified by previously trained classifiers. However, from the fault tolerance perspective, when a neural network ensemble that has been trained using boosting (or adaptive boosting) is deployed and one of the networks fail (due to a fault in the underlying hardware system), there is a high drop in accuracy of the complete system. Stated differently, an ensemble of boosted NNs are sensitive to hardware faults, which makes boosting ill-suited for safety-critical applications which rely on redundancy.

SUMMARY

Techniques for implementing a redundant machine learning system are described. One example is a computing system that includes a processor and memory comprising a machine learning (ML) training application, where, when executed by the processor, the ML training application performs an operation. That operation includes training a first ML model using first training data, evaluating the first ML model while injecting a first hardware fault in a first hardware system executing the first ML model, generating an error characterization value based on an output of the first ML model when experiencing the first hardware fault, adjusting second training data using the error characterization value, and training a second ML model using the adjusted, second training data.

One example described herein is a method that includes training a first ML model using first training data, evaluating the first ML model while injecting a first hardware fault in a first hardware system executing the first ML model, generating an error characterization value based on an output of the first ML model when experiencing the first hardware fault, adjusting second training data using the error characterization value, and training a second ML model using the adjusted, second training data.

One example described herein is non-transitory computer readable storage medium storing instructions, which when executed on a processor, perform an operation. The operation includes training a first ML model using first training data, evaluating the first ML model while injecting a first hardware fault in a first hardware system executing the first ML model, generating an error characterization value based on an output of the first ML model when experiencing the first hardware fault, adjusting second training data using the error characterization value, and training a second ML model using the adjusted, second training data.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

The embodiments herein propose operating redundant machine learning models (e.g., redundant NNs) which have been trained using a boosting technique that considers hardware faults. That is, unlike typical boosting techniques, the embodiments herein describe performing an evaluation process where the performance of a first NN is measured in the presence of one or more hardware faults. The classification errors introduced by the hardware fault can then be used to train a second NN. In one embodiment, a second evaluation process is performed where the combined performance of both the first and second trained NNs is measured in the presence of one or more hardware faults. The resulting errors can then be used when training a third NN. In this manner, a TMR system containing three trained NNs can be developed where the NNs are aware of errors caused by hardware faults. As a result, during operation, if a hardware fault occurs, the three NNs have better performance relative to three NNs that where not trained to be error aware.

Figure 1:
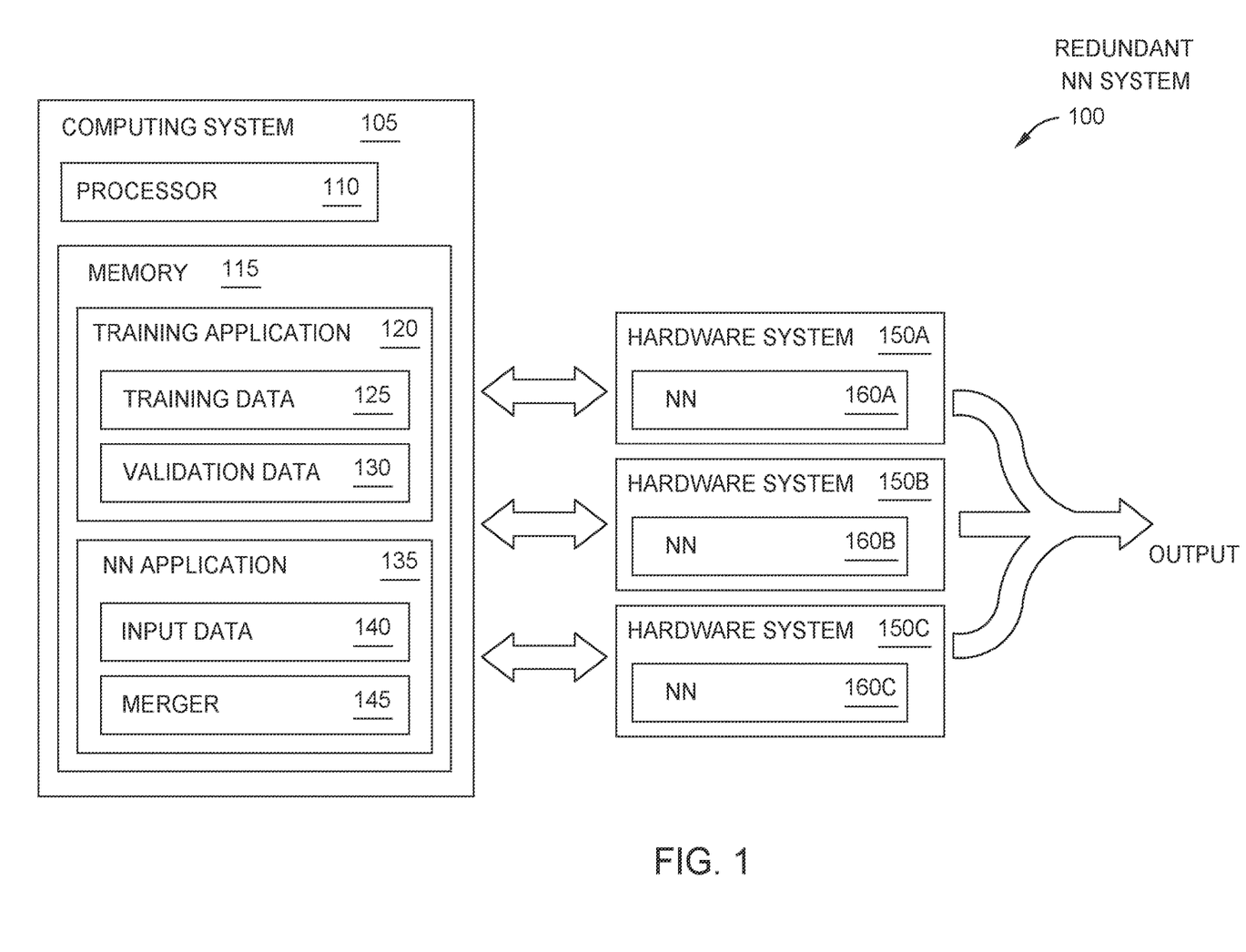
FIG. 1 is a block diagram of a redundant NN system, according to an example.

FIG. 1 is a block diagram of a redundant NN system 100, according to an example. The system 100 includes a computing system 105 and three hardware systems 150A-C that each host (or execute) a NN 160. The computing system 105 can be a computing device (e.g., a server) or group of computing devices (e.g., a data center). The hardware systems 150 can be three separate computing devices (e.g., three servers), three accelerator devices (e.g., three graphics processing units (GPUs), field programmable gate arrays (FPGAs), systems on a chip (SoC), or application specific integrated circuits (ASICs)) that are connected to the same or different computing devices, or three compute paths in the same hardware device (e.g., three different single instruction, multiple threads (SIMD) lanes in the same central processing unit (CPU)).

While the embodiments herein primarily describe executing the NNs 160 on three hardware systems 150 so that the NNs 160 can execute in parallel, the embodiments herein also can be used to train NNs 160 that are time multiplexed so they execute on the same hardware system 150. For example, at time A, the NN 160A executes on the hardware system, at time B, the NN 160A stops executing and the NN 160B begins executing on the hardware system, and at time C the NN 160B stops executing and the NN 160C begins executing on the hardware system. This can be repeated.

In one embodiment, the NNs 160 provide redundancy—e.g., triple redundancy—where their outputs can be combined or evaluated to result in a single result or prediction. That is, during operation, the same input data can be provided to the three NNs 160 which in parallel (or in a time multiplexed manner) provide respective outputs. These outputs can then be combined or evaluated to determine a single output or prediction. If one of the hardware systems 150 experiences a hardware fault which causes the corresponding NN 160 to have an erroneous output, the outputs of the other two NNs 160 will still provide valid outputs. By combining the outputs or using a voting process, the impact of the erroneous output of the faulty NN 160 is either ignored or mitigated. In this way, the NNs 160 are redundant such that a hardware fault in any one of the hardware systems 150 does not make the overall output of the system 100 faulty. Further, while the system 100 illustrates triple redundancy, the embodiments herein can be used with a system that has only two redundant NNs, or can be used where there are four or more redundant NNs.

The computing system 105 includes a processor 110 which represents any number of processing elements (e.g., CPUs) which each can have any number of processing cores. The computing system 105 also includes memory 115 which can include volatile memory elements, non-volatile memory elements, and combinations thereof.

In this example, the memory 115 includes a training application 120 and a NN application 135 (e.g., software applications). The training application 120 trains the NNs 160 using a boosting technique that considers hardware faults. The specifics of how this training can be performed is described in more detail below, but in general, once a first one of the NN 160 is trained using training data 125, the training application 120 can perform an evaluation process (using the validation data 130 as input) on the trained NN in the presence of a simulated or actual hardware fault(s). The training application 120 determines whether the hardware fault introduced any errors into the output of the trained NN and then uses those errors to adjust the training data used to train the next NN (which can be the same training data used to train the first NN or a different set of training data). As a result, the second NN is trained to become error aware.

The NN application 135 controls the execution of the NNs 160 once they have been trained to be error aware by the training application 120. For example, the NN application 135 can receive input data 140 that should be classified by the NNs 160. Each of the NNs 160 can process the same input data 140 to generate respective outputs or predictions. Unlike a typical TMR solution where the NNs are all the same (e.g., one NN is trained and then replicated three times), in the embodiments herein the NNs 160 can be (and are likely going to be) different—e.g., have different weights. This is due to boosting where the training data used to train the NNs 160 is different for each NN due to identifying errors introduced by hardware faults when evaluating another NN 160.

The NN application 135 includes a merger 145 for merging the individual outputs or predictions of the three NNs 160 and generating a single output or prediction. This can be done by voting (to identify and remove/ignore any outliers) or by combining the outputs in a manner such that the negative impact of an output from a NN experiencing a hardware fault is mitigated or removed. Again, while the system 100 illustrates three NNs, it can have two, or more than three NNs (although voting may not be an option to merge the outputs if only two NNs are used and instead duplication with comparison can be used). In this manner, if one of the hardware systems 150 experiences a fault during operation, the system 100 still provides a reliable and accurate result that can be used by a downstream processing system.

While the embodiments herein primarily discussing using NNs, the embodiments herein can be applied to other types of machine learning models which benefit from increased resiliency to hardware faults such as decision trees, linear regression, and the like.

Figure 2:
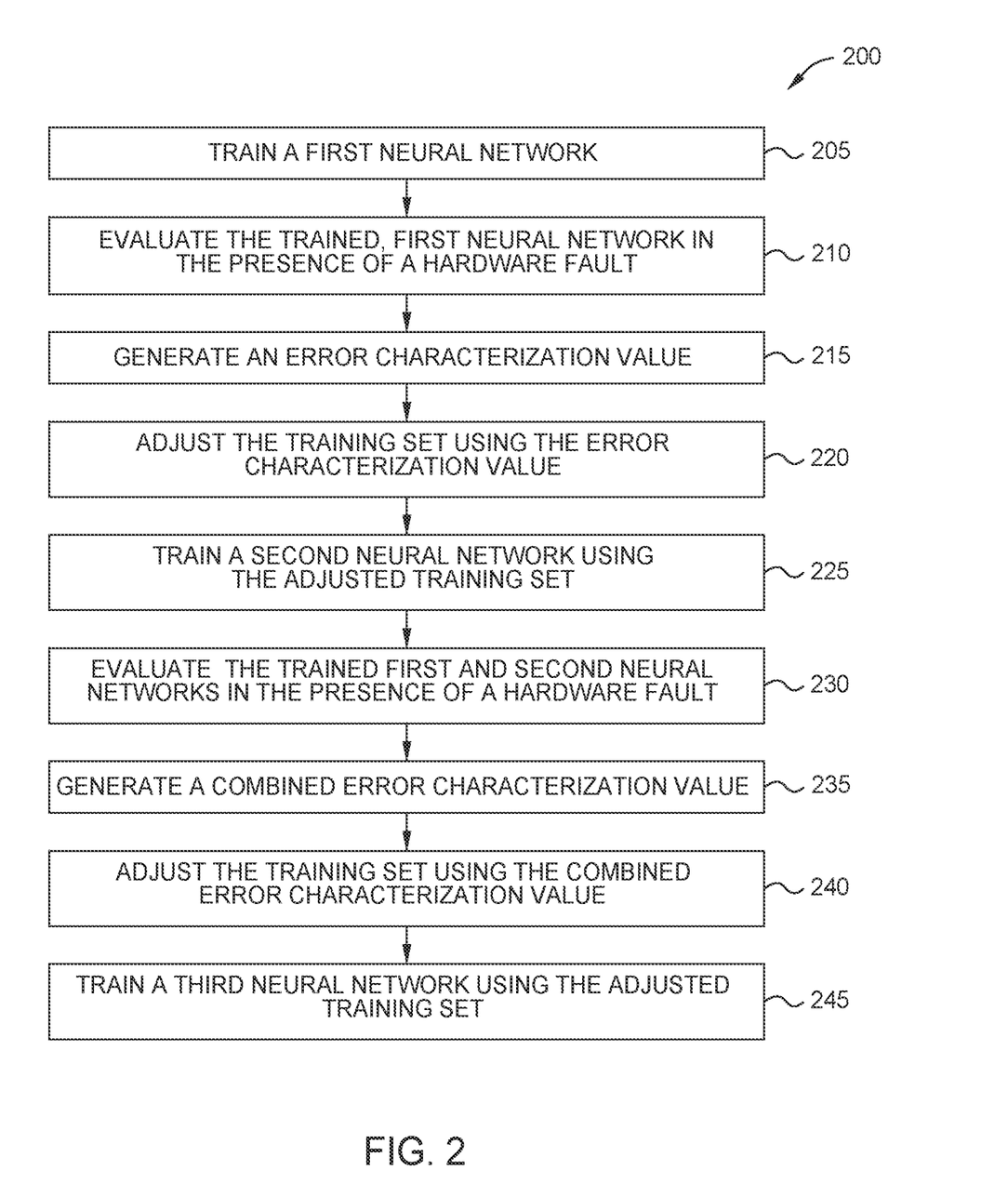
FIG. 2 is a flowchart for considering hardware faults when boosting NNs, according to an example.

FIG. 2 is a flowchart of a method 200 for considering hardware faults when boosting NNs, according to an example. For clarity, the method 200 is discussed in tandem with FIGS. 3-7 which illustrate varies steps when training three NNs used in a redundant system. Further, the method 200 describes training three NNs but can be used to train only two NNs, or can be extended to train more than four NNs.

At block 205, the training application trains a first neural network using training data. The embodiments herein are not limited to any particular training technique, and any suitable training technique can be used.

Figure 3:
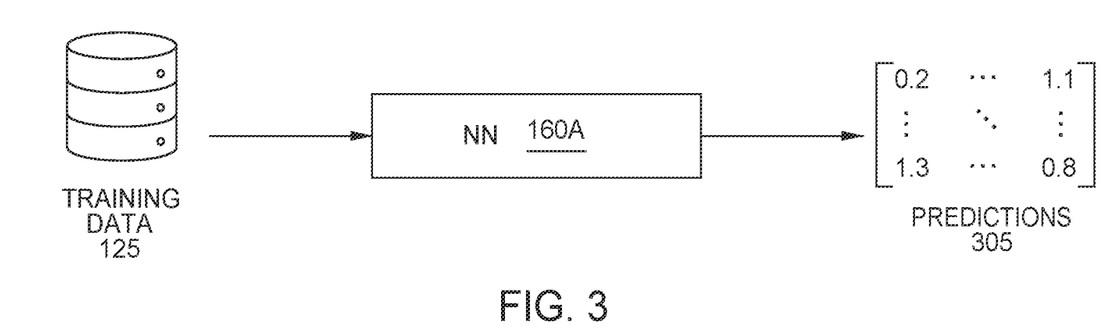
FIG. 3 illustrates training a first NN, according to an example.

FIG. 3 illustrates training a first NN, according to an example. As shown, the training data 125 is provided as input to the NN 160A which is then used to generate outputs (i.e., a matrix of predictions 305). In one embodiment, the training data 125 is annotated so that the accuracy of the predictions 305 can be determined and the weights used by the NN 160A can be adjusted during the training process. However, in other embodiments, the training data 125 may not be annotated if unsupervised learning is used.

At block 210, the training application evaluates the trained first NN in the presence of one or more hardware faults. For example, the training application can simulate a hardware fault in the hardware system executing the trained first NN, or create an actual hardware fault in the hardware system. The embodiments herein are not limited to any particular type of hardware fault, but could include such examples as an arithmetic-logic unit (ALU) that stops working, radiation causing a memory fault (e.g., a flipped bit), or a manufacturing defect.

The importance of the hardware element experiencing the hardware fault to the NN determines the size of the impact the hardware fault has on the output of the NN. For example, if a non-functioning ALU is not used very often, the fault may have little impact on the output. But if the ALU is frequently used, the impact is larger. This impact can be identified by an error between the output of the NN in the presence of the hardware fault and the expected output of the NN without the hardware fault.

Figure 4:
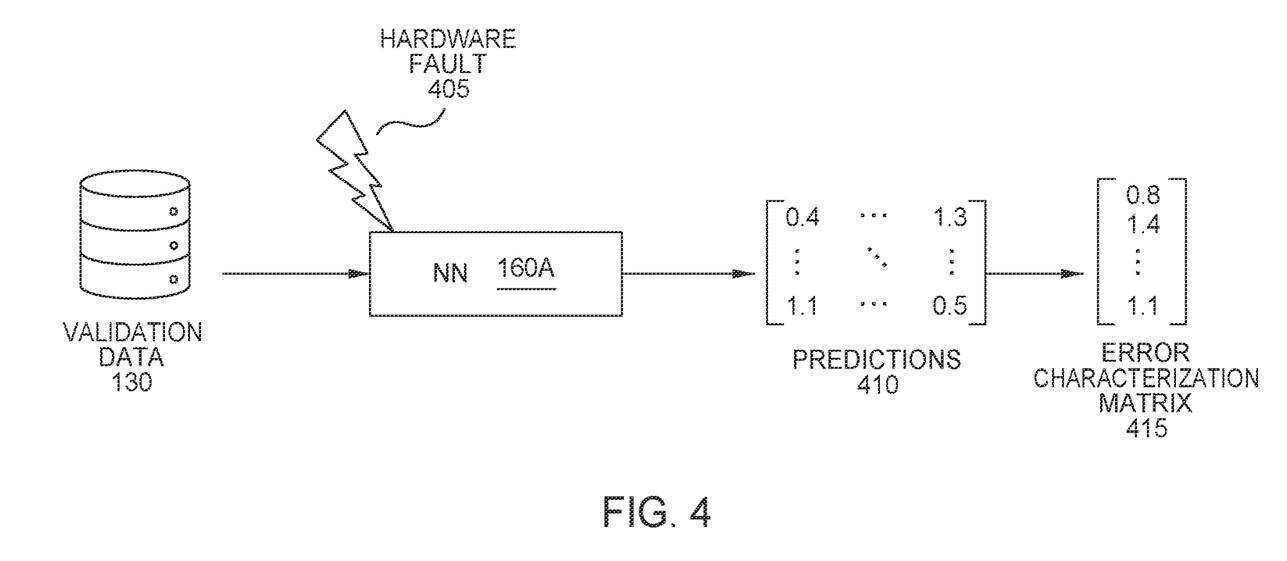
FIG. 4 illustrates identifying an error characterization matrix caused by hardware faults affecting the first NN, according to an example.

FIG. 4 illustrates identifying an error characterization matrix caused by hardware faults affecting the first NN, according to an example. In FIG. 4, the validation data 130 is provided as input to the trained NN 160A. While processing the validation data 130 (which may the same, or different from, the training data 125), the training application injects one or more hardware faults 405 (either simulated or actual) into the hardware system executing the NN 160A. The NN 160A then generates predictions 410 which are potentially negatively impacted by the hardware fault 405.

In one embodiment, the evaluation process at block 210 is repeated for different hardware faults. For example, during a first evaluation process, the hardware fault 405 may be a first ALU that is nonfunctioning, but during a second evaluation process, the hardware fault 405 is a second, different nonfunctioning ALU. During a third evaluation process, there may be a memory fault in one of the memory elements, while during a fourth evaluation process the hardware fault 405 is a manufacturing defect. Thus, the training application can perform many different iterations during the evaluation process where the same validation data 130 is used as an input, but a different hardware fault 405 is injected. Further, in some evaluation runs, the training application may inject a combination of hardware faults (e.g., two memory faults, or a nonfunctioning ALU and a memory fault).

The number and types of hardware faults is a design choice. In one embodiment, the system administrator may perform the evaluation process using only hardware faults 405 that are most likely to happen. In another embodiment, the system administrator may consider only the hardware faults that have a significant impact on the NN (e.g., according to a threshold) but ignore the hardware faults that have little impact on the predictions 410. Thus, when adjusting the training data for the next NN to be trained, the evaluation processes where the hardware faults did not significantly impact the predictions 410 may be ignored.

In FIG. 4, the predictions 410 are represented in a matrix where each column records the results of a particular evaluation process in the presence of a different hardware fault. That is, the first column indicates the output of the NN 160A in the presence of a first hardware fault, the second column indicates the output of the NN 160A in the presence of a second hardware fault, and so forth. The rows in the predictions 410 can represent the predictions for different types of objects or things being classified. For example, the first row may contain predictions related to dogs, the second row may contain predictions related to cats, a third row may contain predictions related to birds, and so on. Thus, the matrix of predictions 410 indicates how well the NN 160A was able to identify different classifications (e.g., objects such as birds, dogs, cats) in the presence of different hardware faults.

At block 215, the training application generates an error characterization value that represents the error caused by the hardware fault during the evaluation process at block 210. In FIG. 4, this error characterization value is part of an error characterization matrix 415 (or vector). This matrix 415 indicates how well the NN 160A was able to identify each of the classifications (i.e., corresponding to the rows in the predictions 410) in the presence of the hardware faults 405. For example, a high number in the matrix 415 may indicate the NN 160A was able to successfully identify a particular object even in the presence of multiple different hardware faults 405 while a low number in the matrix 415 indicates the hardware faults 405 had a larger negative impact on the ability of the NN 160A to detect the classification. Thus, in the example, the error characterization matrix 415 generalizes the ability of the NN 160A to detect different classifications in the presence of the various hardware faults 405 injected during multiple iterations of the evaluation process. Further, the embodiments herein are not limited to performing classifications and can but used for machine learning models that perform other tasks such as segmentation, object detection, and the like.

In another embodiment, instead of evaluating the classifications as a whole by generating the matrix 415, the training application may instead evaluate the ability of the NN 160A to classify a particular data point in the validation data 130 (or the training data) in the presence of the hardware fault 405. For example, the training application may evaluate whether the NN 160A was able to identify an object (e.g., a dog) in a particular image. If not, the training application can assign a higher weight to that image. As described below, by emphasizing the classifications (or the specific data points or images) that where misclassified during the evaluation process due to the hardware faults, the next NN can be trained to be more sensitive to those classifications or data points.

At block 220, the training application adjusts the training set using the error characterization value. That is, the training application adjusts the training set to emphasize the classifications or the data points that were most likely to be misclassified by the first NN in the presence of hardware faults. For example, if the first NN was generally unable to accurately identify dogs during the evaluation process (which is reflected by the error characterization value), the training application can emphasize the training data that includes dogs so that the second NN is better trained to recognize dogs. Further, if the first NN was generally able to accurately identify cats during the evaluation process (which is also reflected in the error characterization value), the training data with cats may be deemphasized which may result in the second NN being less able to accurately identify cats relative to the first NN. However, this result may be desirable since the first NN can accurately detect cats regardless whether it is, or is not, experiencing a hardware fault. By specializing the second NN to more accurately detect dogs, the output of the second NN can compensate for when the first NN is experiencing a hardware fault and cannot accurately identify dogs.

Figure 5:
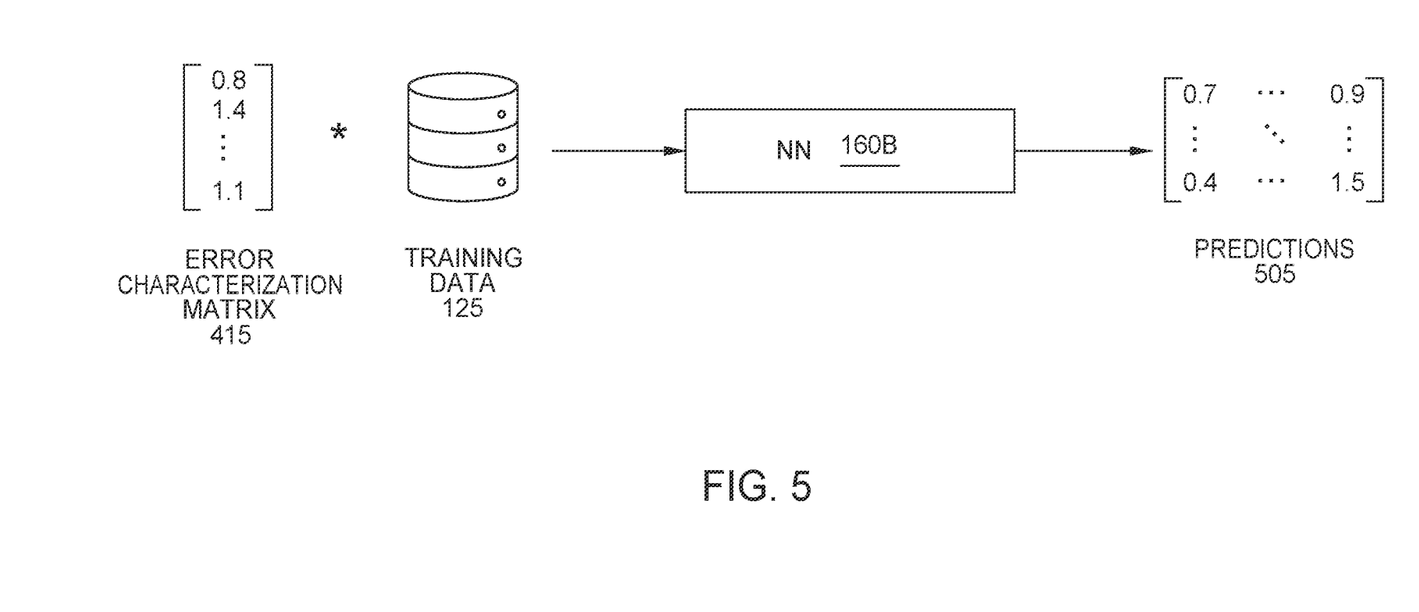
FIG. 5 illustrates training a second NN using the error characterization matrix from FIG. 4, according to examples.

FIG. 5 illustrates training a second NN using the error characterization matrix from FIG. 4, according to examples. As shown, the training application adjusts the training data 125 by applying it with the error characterization matrix 415 (e.g., one example of an error characterization value). Doing so emphasizes in the training data 125 the data that includes classifications (e.g., objects) that the first NN was unable to accurately identify in the presence of hardware faults. Further, this also deemphasizes in the training data 125 the data including classifications that the first NN was able to accurately identify in the presence of hardware faults. In this manner, the training data 125 is customized to make the second NN 160B aware of the errors a hardware fault causes in the first NN, and to compensate for those errors.

While FIG. 5 illustrates multiplying the error characterization matrix 415 with the training data 125, in another embodiment, the training application may identify a data point (e.g., a particular image) that was misclassified by the first NN during the evaluation process and emphasize a corresponding data point (e.g., the same image) in the training data 125 so that the second NN 160B is trained so it is more likely to accurately classify that image. The opposite may be done for data points that the first NN was able to correctly classify during the evaluation process, where corresponding data points in the training data 125 are deemphasized which may result in the NN 160B being less likely to correctly classify these data set. However, as discussed above, this is a suitable result since the evaluation process performed at block 215 discovered the first NN is able to accurately classify those images, even in the presence of a hardware fault.

At block 225, the training application trains the second NN (e.g., the NN 160B in FIG. 5) using the adjusted training set. Thus, rather than using the same training data 125 used to train the first NN, the training data 125 in FIG. 5 is adjusted to compensate for the errors hardware faults can cause in the first NN.

At block 230, the training application evaluates the trained first and second neural networks in the presence of a hardware fault. In one embodiment, this evaluation process can use the same validation data used in the evaluation process in block 210, but this is not a requirement.

Figure 6:
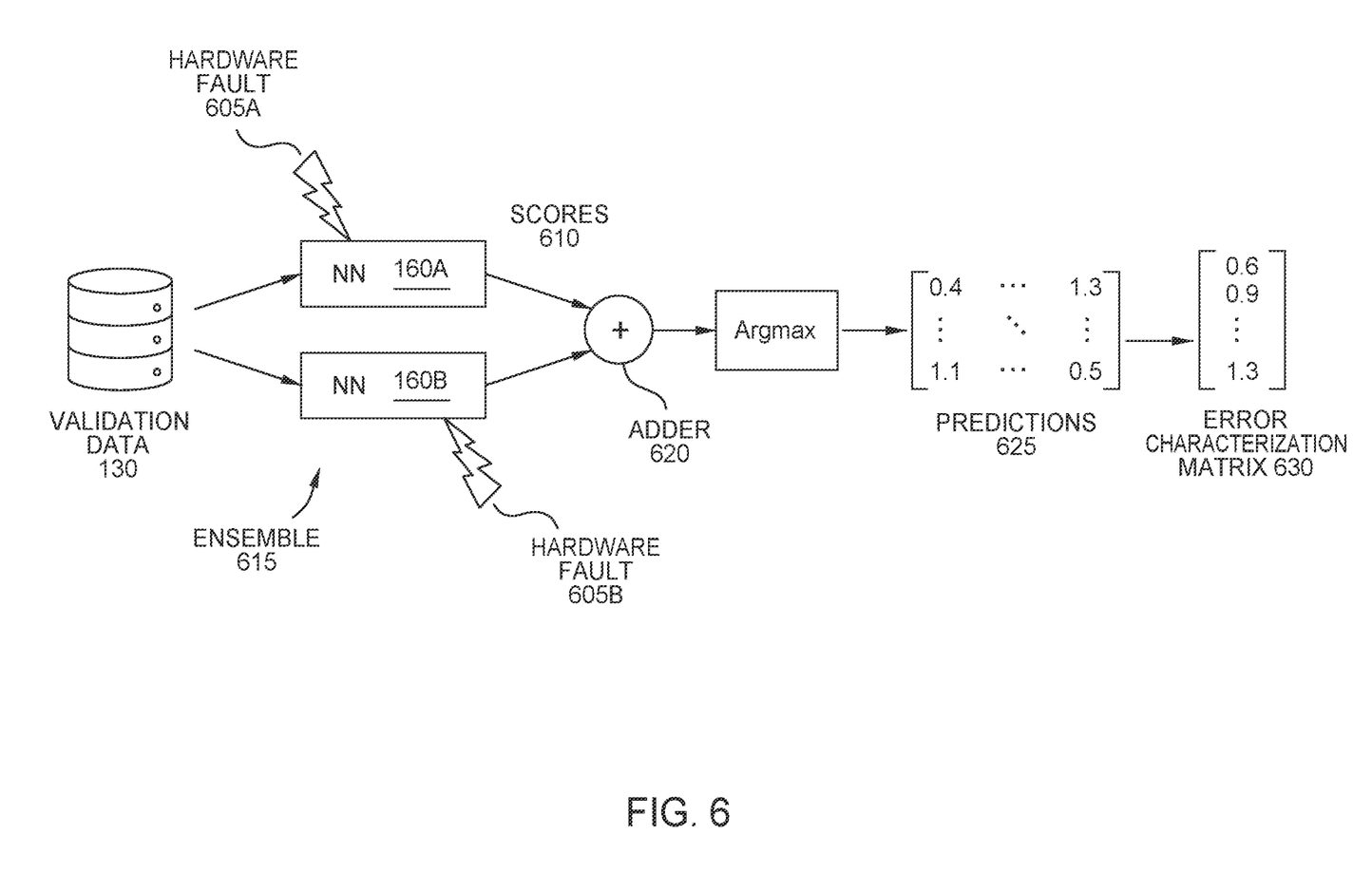
FIG. 6 illustrates identifying an error characterization matrix caused by hardware faults affecting the first and second NNs, according to an example.

FIG. 6 illustrates identifying an error characterization matrix 630 caused by hardware faults 605 affecting the first and second NNs 160A and 160B, according to an example. In this example, the validation data 130 is transmitted to both NN 160A and 160B, which form an ensemble 615. In one embodiment, the training application injects a hardware fault 605 in only one of the hardware systems executing the NNs 160A and 160B. For example, the training application may inject a hardware fault 605A that affects the NN 160A while no hardware fault is injected into the hardware system executing the NN 160B. However, the evaluation process may have several iterations (just like the evaluation process at block 210) where in some iterations a hardware fault 605B is injected into the hardware system executing the NN 160B but not the hardware system executing the NN 160A. Doing so simulates one of the hardware systems experiencing a fault while the other continues to operate normally. This may better represent a redundant NN system where the NNs are executed on independent hardware systems. There, it is very unlikely that there would be two hardware faults at the same time. Like in block 210, the evaluation process can have multiple iterations where a different hardware fault 605 is injected into one of the hardware systems during each iteration.

In one embodiment, the training application may inject hardware faults into both hardware systems executing the NN 160A and 160B. This may better represent a NN system where the NNs 160A and 160B are executed on the same hardware system but in a time multiplexed manner. Further, the hardware faults 605A and 605B may be the same hardware fault (e.g., the same nonfunctioning ALU or defective memory element) since the same hardware system executes both of the NNs 160A and 160B. This process can have multiple iterations that each injects a different hardware fault.

FIG. 6 also illustrates an adder 620 that combines the output of the NNs 160A and 160B. The combined output is then transmitted to an Argmax block which is an operation that finds the argument that gives the maximum value from a target function. The adder 620 and the Argmax block may part of the merger 145 in FIG. 1. The output of the Argmax block generates the predictions 625 from the combined operation of the NNs 160A and 160B.

At block 235, the training application generates a combined error characterization value from the predictions generated during the evaluation process. In the example shown in FIG. 6, the training application compares the predictions 625 to the expected predictions without the hardware faults to identify the error characterization matrix 630, which indicates which classifications were most impacted by the hardware faults 605. As above, using an error characterization matrix 630, which generalizes or averages the misclassifications across all the hardware faults 605, as the combined error characterization value is just one example. The error characterization value can instead be weightings provided to specific data points in the validation data 130 that were misclassified due to the hardware faults 605—i.e., increasing the importance of those data points when training the NN. Data points that were correctly classified by deemphasized by lowering corresponding weightings—i.e., decreasing the importance of those data points when training the NN.

Figure 7:
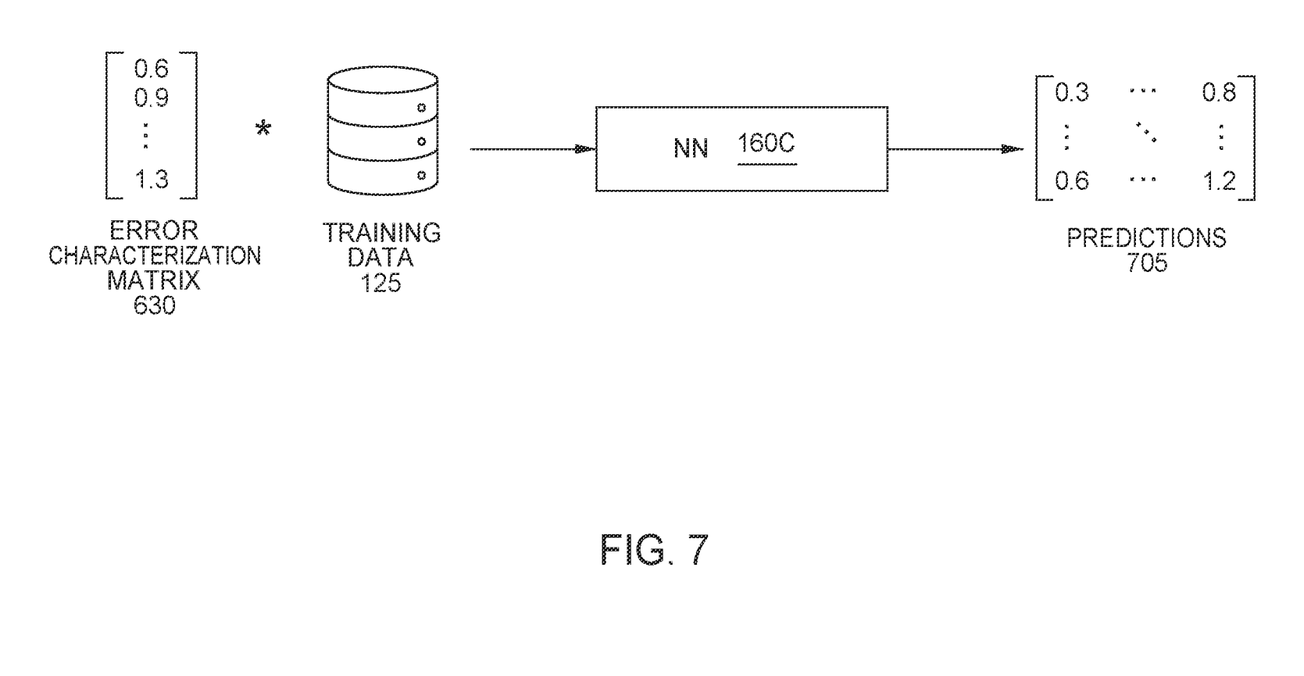
FIG. 7 illustrates training a third NN using the error characterization matrix from FIG. 6, according to examples.

At block 240, the training application adjusts the training set using the combined error characterization value. An example of this is shown in FIG. 7 where a third NN 160C is trained using the error characterization matrix 630 from FIG. 6. Specifically, the error characterization matrix 630 is multiplied with the training data 125 to generate the adjusted data which is then used as an input to the NN 160C. The error characterization matrix 630 emphasizes the classifications that were misclassified by the ensemble 615 in FIG. 6. Further, the error characterization matrix 630 can deemphasize the classifications that were correctly classified by the ensemble 615.

At block 245, the training application trains the third NN using the adjusted training data. In this manner, the third NN 160C is trained to better classify the classifications that are poorly classified by the ensemble 615 in the presence of a hardware fault. That is, the NN 160C is trained to output predictions 705 that are weighted to more accurately identify the classifications that are poorly identified by the ensemble 615 when experiencing a hardware fault.

While the method 200 indicates blocks for training three NNs to be error aware, it can be modified to train two NN (where only blocks 205-225 are performed) or train four NNs (where blocks 230-245 are repeated to train the fourth NN), or train five, six, seven NNs.

Figure 8:
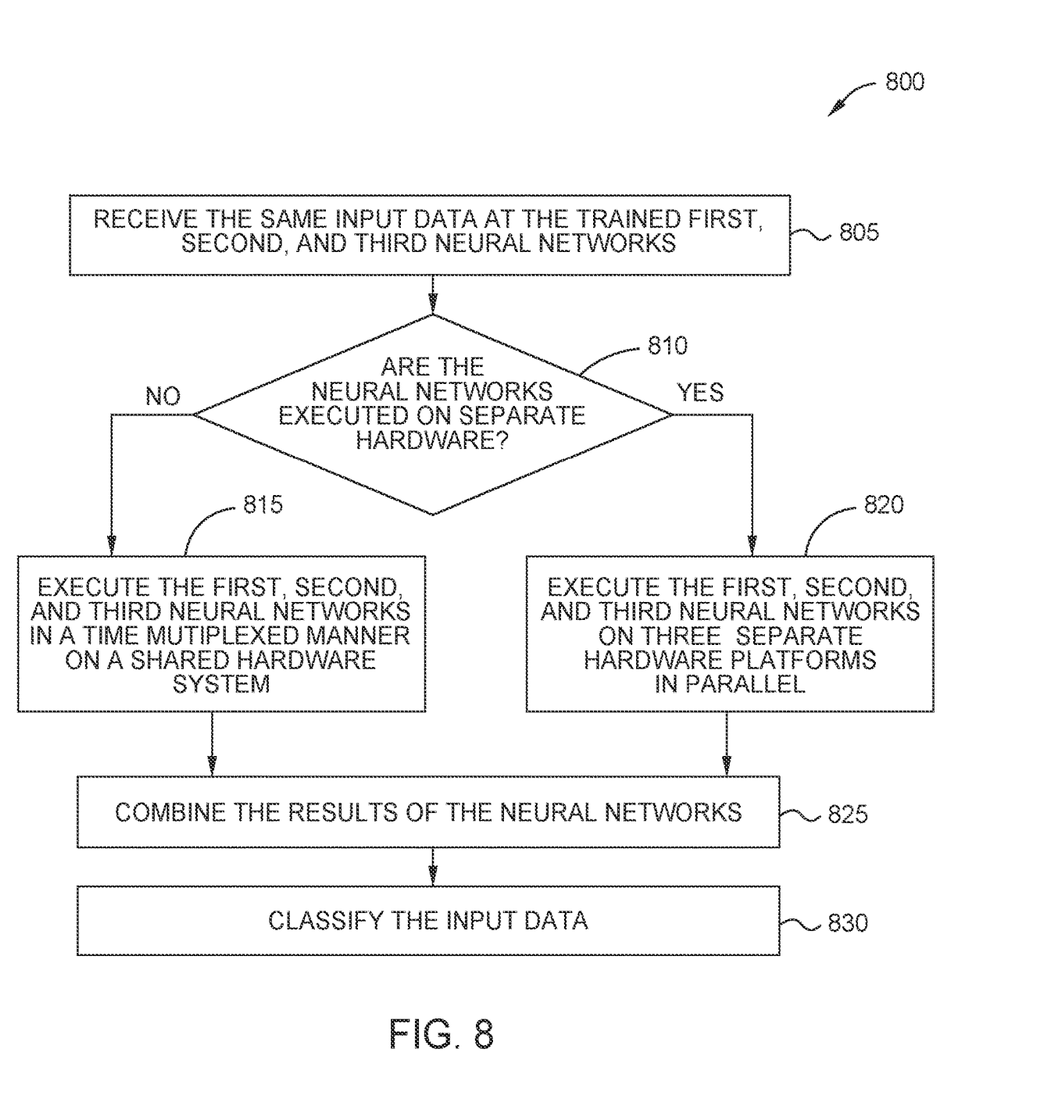
FIG. 8 is a flowchart for operating a redundant NN system that is error aware, according to examples.

FIG. 8 is a flowchart of a method 800 for operating a redundant NN system that is error aware, according to examples. The method 800 is performed after performing the method 200 where two or more NNs are trained to be aware of errors caused by hardware faults. In the method 800, it is assumed the training application has trained three NNs.

At block 805, the three NNs receive the same input data. That is, the three NNs (e.g., NNs 16A-160C) are redundant neural networks that operate on the same data to generate respective outputs.

At block 810, the method 800 branches depending on whether the redundant system is set up such that each NN executes on its own hardware system (e.g., computing device, accelerator, SIMD lane, etc.) or the three NNs execute on the same hardware system in a time multiplexed manner. If the later, the method 800 proceeds to block 815 where the three NNs execute in a time multiplexed manner on a shared hardware system (e.g., the same server or artificial intelligence (AI) accelerator). If the former, the method 800 proceeds to block 820 where each NN executes on its own hardware system. In one embodiment, the three NNs execute in parallel on their respective hardware systems. That is, the three NNs can process the input data at the same time.

At block 815, the merger combines the results of the three neural networks, and at block 830, the merged result is used to classify the input data—e.g., identify objects in images, perform textual analysis, speech recognition, and the like. The embodiments herein may also be used in machine learning models that implement regression algorithms.

Figure 9:
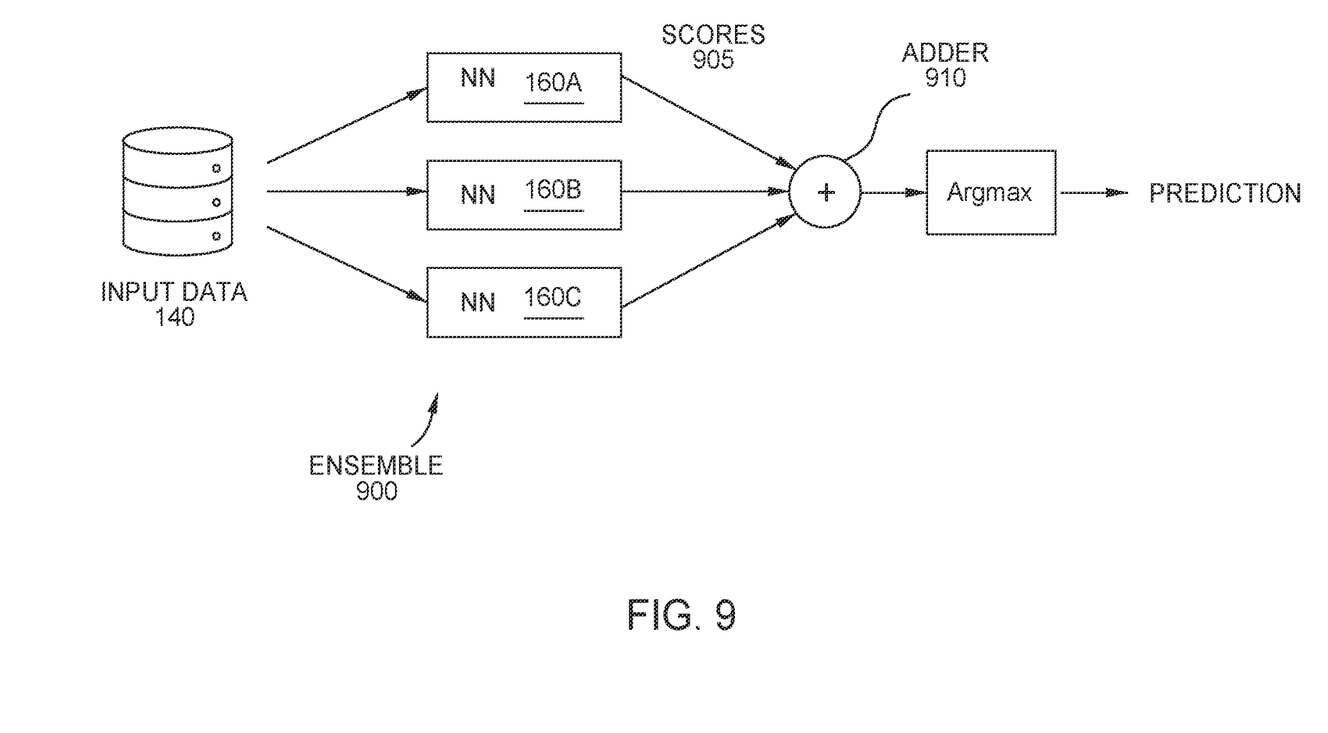
FIG. 9 illustrates a redundant NN system that is error aware, according to examples.

FIG. 9 illustrates a redundant NN system that is error aware, according to examples. In this example, FIG. 9 illustrates a system that performs the method 800 where the NNs 160A-C execute on their own hardware systems. As shown, the NNs 160 form an ensemble 900 that each receives the input data 140. The scores 905 (or outputs) of the NNs 160 are combined by an adder 910 and processed by the Argmax block to result in an overall prediction for the ensemble 900. Although the NNs 160 may be different NNs 160 due to adjusting the training data based on errors resulting from hardware faults, the system in FIG. 9 provides redundancy and improved accuracy during a hardware fault relative to a TMR system where the NNs are trained using the same training data.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A computing system, comprising:
   a processor; and
   memory comprising a machine learning (ML) training application, wherein, when executed by the processor, the ML training application performs an operation, the operation comprising:
      training a first ML model using first training data;
      evaluating the first ML model while injecting a first hardware fault in a first hardware system executing the first ML model;
      generating an error characterization matrix indicating identification accuracy of the first ML model in identifying a plurality of classifications in the first training data when the first hardware fault is present;
      adjusting second training data using the error characterization matrix by emphasizing a first set of classifications of the plurality of classifications that the first ML model misclassified when the first hardware fault was present and deemphasizing a second set of classifications of the plurality of classifications that the first ML model correctly classified when the first hardware fault was present; and
      training a second ML model using the adjusted, second training data.

2. The computing system of claim 1, wherein the operation comprises:
   evaluating, using multiple iterations, the first ML model while injecting a different hardware fault in the first hardware system during each of the multiple iterations, wherein the error characterization matrix represents an impact the different hardware faults and the first hardware fault have on each of the plurality of classifications of the first ML model.

3. The computing system of claim 1, wherein the deemphasizing of the second set of classifications occurs by decreasing a weight value of the second set of classifications and the emphasizing of the first set of classifications occurs by increasing a weight value of the first set of classifications.

4. The computing system of claim 1, wherein the operation comprises:
   evaluating the first ML model and the second ML model while injecting a second hardware fault in at least one of: the first hardware system executing the first ML model or a second hardware system executing the second ML model;
   generating a second error characterization matrix based on a combined output of the first ML model and the second ML model when experiencing the second hardware fault;
   adjusting third training data using the second error characterization matrix; and
   training a third ML model using the adjusted, third training data.

5. The computing system of claim 4, wherein the first, second, and third training data is the same but the adjusted, second training data and the adjusted third training data is different.

6. The computing system of claim 4, wherein the second hardware fault is injected only in one of the first hardware system or the second hardware system.

7. The computing system of claim 4, wherein the second hardware fault is injected into both of the first hardware system and the second hardware system.

8. The computing system of claim 4, wherein the operation comprises:
   evaluating, using multiple iterations, the first ML model and the second ML model while injecting a different hardware fault during each of the multiple iterations.

9. A method, comprising:
   training a first ML model using first training data;
   evaluating the first ML model while injecting a first hardware fault in a first hardware system executing the first ML model;
   generating an error characterization matrix indicating identification accuracy of the first ML model in identifying a plurality of classifications in the first training data when the first hardware fault is present;
   adjusting second training data using the error characterization matrix by emphasizing a first set of classifications of the plurality of classifications that the first ML model misclassified when the first hardware fault was present and deemphasizing a second set of classifications of the plurality of classifications that the first ML model correctly classified when the first hardware fault was present; and training a second ML model using the adjusted, second training data.

10. The method of claim 9, further comprising:
evaluating, using multiple iterations, the first ML model while injecting a different hardware fault in the first hardware system during each of the multiple iterations,
wherein the error characterization matrix represents an impact the different hardware faults and the first hardware fault have on each of the plurality of classifications of the first ML model.

11. The method of claim 9, wherein the deemphasizing of the second set of classifications occurs by decreasing a weight value of the second set of classifications and the emphasizing of the first set of classifications occurs by increasing a weight value of the first set of classifications.

12. The method of claim 9, further comprising:
evaluating the first ML model and the second ML model while injecting a second hardware fault in at least one of: the first hardware system executing the first ML model or a second hardware system executing the second ML model;
generating a second error characterization matrix based on a combined output of the first ML model and the second ML model when experiencing the second hardware fault;
adjusting third training data using the second error characterization matrix; and
training a third ML model using the adjusted, third training data.

13. The method of claim 12, wherein the second hardware fault is injected only in one of the first hardware system or the second hardware system.

14. The method of claim 12, wherein the second hardware fault is injected into both of the first hardware system and the second hardware system.

15. The method of claim 12, further comprising:
evaluating, using multiple iterations, the first ML model and the second ML model while injecting a different hardware fault during each of the multiple iterations.

16. A non-transitory computer readable storage medium storing instructions, which when executed on a processor, perform an operation, the operation comprising:
training a first ML model using first training data;
evaluating the first ML model while injecting a first hardware fault in a first hardware system executing the first ML model;
generating an error characterization matrix indicating identification accuracy of the first ML model in identifying a plurality of classifications in the first training data when the first hardware fault is present;
adjusting second training data using the error characterization matrix by emphasizing a first set of classifications of the plurality of classifications that the first ML model misclassified when the first hardware fault was present and deemphasizing a second set of classifications of the plurality of classifications that the first ML model correctly classified when the first hardware fault was present; and
training a second ML model using the adjusted, second training data.

17. The non-transitory computer readable storage medium of claim 16, the operation further comprising:
evaluating, using multiple iterations, the first ML model while injecting a different hardware fault in the first hardware system during each of the multiple iterations,
wherein the error characterization matrix represents an impact the different hardware faults and the first hardware fault have on each of the plurality of classifications of the first ML model.

18. The non-transitory computer readable storage medium of claim 16, wherein the deemphasizing of the second set of classifications occurs by decreasing a weight value of the second set of classifications and the emphasizing of the first set of classifications occurs by increasing a weight value of the first set of classifications.

19. The non-transitory computer readable storage medium of claim 16, wherein the operation further comprises:
evaluating the first ML model and the second ML model while injecting a second hardware fault in at least one of: the first hardware system executing the first ML model or a second hardware system executing the second ML model;
generating a second error characterization matrix based on a combined output of the first ML model and the second ML model when experiencing the second hardware fault;
adjusting third training data using the second error characterization matrix; and
training a third ML model using the adjusted, third training data.

20. The non-transitory computer readable storage medium of claim 19, wherein the operation further comprises:
evaluating, using multiple iterations, the first ML model and the second ML model while injecting a different hardware fault during each of the multiple iterations.

\* \* \* \* \*